(12) United States Patent
Sharifi et al.

(10) Patent No.: US 10,299,089 B2
(45) Date of Patent: May 21, 2019

(54) CONTEXTUALLY PROMPTING USERS TO SWITCH COMMUNICATION MODES

(71) Applicant: Google LLC, Mountain View, CA (US)

(72) Inventors: Matthew Sharifi, Kilchberg (CH); Jakob Nicolaus Foerster, Zurich (CH)

(73) Assignee: Google LLC, Mountain View, CA (US)

( * ) Notice: Subject to any disclaimer, the term of this patent is extended or adjusted under 35 U.S.C. 154(b) by 97 days.

(21) Appl. No.: 15/238,395

(22) Filed: Aug. 16, 2016

(65) Prior Publication Data
US 2018/0054691 A1 Feb. 22, 2018

(51) Int. Cl.
| | | |
|---|---|---|
| H04L 29/06 | (2006.01) | |
| G06Q 10/10 | (2012.01) | |
| H04W 4/50 | (2018.01) | |
| H04L 12/58 | (2006.01) | |
| H04M 1/725 | (2006.01) | |
| H04W 4/14 | (2009.01) | |
| H04W 88/02 | (2009.01) | |

(52) U.S. Cl.
CPC .......... *H04W 4/50* (2018.02); *G06Q 10/107* (2013.01); *H04L 51/04* (2013.01); *H04L 51/32* (2013.01); *H04L 65/403* (2013.01); *H04L 67/42* (2013.01); *H04M 1/72544* (2013.01); *H04M 1/72563* (2013.01); *H04W 4/14* (2013.01); *H04W 88/02* (2013.01)

(58) Field of Classification Search
CPC ....... H04L 51/04; H04L 51/32; H04L 65/403; H04L 67/42; H04M 1/72544; H04M 1/72563; H04W 4/001; H04W 4/14; H04W 88/02

USPC .................................................. 455/418–420
See application file for complete search history.

(56) References Cited

U.S. PATENT DOCUMENTS 9,344,675 B1 5/2016 Chord et al.
2006/0053379 A1 3/2006 Henderson et al.
(Continued)

OTHER PUBLICATIONS

PCT International Search Report and Written Opinion dated Nov. 17, 2017 for PCT International Application No. PCT/US2017/046756, 11 pages.
(Continued)

*Primary Examiner* — Erica Navar
(74) *Attorney, Agent, or Firm* — IP Spring

(57) ABSTRACT

A computer-implemented technique can include detecting, by a first computing device, a set of user communications at least one of transmitted to and received by from a second computing device via a first communication mode, identifying a second communication mode that is available for communication between the first and second computing devices, and obtaining an appropriateness score for the first and second communication modes based on a contextual feature of the set of user communications, wherein the contextual feature relates an appropriateness of a particular communication mode for the set of user communications, and wherein each appropriateness score is indicative of a level of the appropriateness of a particular communication mode for the set of user communications. The technique can also include selectively outputting a suggestion to switch from the first communication mode to the second communication mode.

24 Claims, 4 Drawing Sheets

(56) References Cited

U.S. PATENT DOCUMENTS

| | | | | |
|---|---|---|---|---|
| 2008/0043986 A1* | 2/2008 | Darby | ............... | H04M 3/5322 |
| | | | | 379/265.09 |
| 2008/0147639 A1* | 6/2008 | Hartman | ............... | G06F 3/0482 |
| 2010/0312836 A1 | 12/2010 | Serr et al. | | |
| 2011/0029647 A1* | 2/2011 | Ginevan | ............... | H04L 12/145 |
| | | | | 709/223 |
| 2013/0041957 A1* | 2/2013 | Davenport | ............... | H04L 51/36 |
| | | | | 709/206 |

OTHER PUBLICATIONS

Unified Communications—Wikipedia, May 8, 2016 (May 8, 2016), XP055422667, Retrieved from the Internet: URL: https://en.wikipedia.org/w/index.php?title=unified_communications&oldid=719179720, retrieved on Nov. 8, 2017 (Nov. 8, 2017), pp. 1-6.

* cited by examiner

CONTEXTUALLY PROMPTING USERS TO SWITCH COMMUNICATION MODES

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

There are many different communication modes by which users can communicate via a network using their computing devices (e.g., mobile phones). One subset of these communication modes is electronic messaging, which includes text messaging and email. Another subset of these communication modes includes real-time communication sessions, such as audio-only (e.g., voice call) and audio/video (e.g., video chat) communication sessions. Each of these various communication modes has both advantages and disadvantages.

SUMMARY

According to one aspect of the present disclosure, a computer-implemented method is presented. The method can include detecting, by a first computing device having one or more processors, a set of user communications, each user communication being transmitted to or received from a second computing device via a first communication mode that defines a first communication protocol for communication between the first and second computing devices; identifying, by the first computing device, a second communication mode that is available for communication between the first and second computing devices, the second communication mode defining a different second communication protocol for communication between the first and second computing devices; obtaining, by the first computing device, an appropriateness score for the first and second communication modes based on a contextual feature of the set of user communications, wherein the contextual feature relates an appropriateness of a particular communication mode for the set of user communications, and wherein each appropriateness score is indicative of a level of appropriateness of a particular communication mode for the set of user communications; and when the appropriateness score for the second communication mode satisfies a threshold, outputting, by the first computing device, a suggestion to switch from the first communication mode to the second communication mode.

According to another aspect of the present disclosure, a computing device is presented. The computing device can include a non-transitory computer-readable medium having a set of instructions stored thereon and one or more processors configured to execute the set of instructions, which causes the one or more processors to perform operations. The operations can include detecting a set of user communications, each user communication being transmitted to or received from a second computing device via a first communication mode that defines a first communication protocol for communication between the first and second computing devices; identifying a second communication mode that is available for communication between the first and second computing devices, the second communication protocol defining a different second communication protocol for communication between the first and second computing devices; obtaining an appropriateness score for the first and second communication modes based on a contextual feature of the set of user communications, wherein the contextual feature relates an appropriateness of a particular communication mode for the set of user communications, and wherein each appropriateness score is indicative of a level of appropriateness of a particular communication mode for the set of user communications; and when the appropriateness score for the second communication mode satisfies a threshold, outputting a suggestion to switch from the first communication mode to the second communication mode.

In some implementations, the method/operations further comprise receiving, by the first computing device, a command that causes the first computing device to switch from the first communication mode to the second communication mode. In some implementations, outputting the suggestion includes displaying, by the first computing device, a pop-up menu including one or more selectable options for causing the first computing device to switch or not to switch from the first communication mode to the second communication mode. In some implementations, the method/operations further comprise in response to switching from the first communication mode to the second communication mode: transferring, by the first computing device, the set of user communications from a first software application associated with the first communication mode to a second software application associated with the second communication mode; and displaying, by the first computing device, the set of user communications in the second software application.

In some implementations, each user communication includes text; the first communication mode is one of text messaging and email; the second communication mode is the other of text messaging and email; and the contextual feature for the set of user communications is indicative of a length of the text of each user communication. In some implementations, shorter text is indicative of text messaging having a greater appropriateness score than email, and wherein longer text is indicative of text messaging having a lower appropriateness score than email. In some implementations, the first and second communication modes are each selected from the group consisting of: (i) text messaging; (ii) email; (iii) a real-time, audio-only communication session; and (iv) a real-time, audio/video communication session.

In some implementations, each user communication includes text; the first communication mode is one of text messaging and email; the second communication mode is one of a real-time audio-only communication session and a real-time audio/video communication session; and the contextual feature for the set of user communications is indicative of a length of the text of each user communication. In some implementations, shorter text is indicative of text messaging and email having a higher appropriateness score than real-time audio-only and audio/video communication sessions, and wherein longer text is indicative of text messaging and email having a lower appropriateness score than real-time audio-only and audio/video communication sessions. In some implementations, the contextual feature for the set of user communications is indicative of a level of familiarity between first and second users of the first and second computing devices, and wherein a level of familiarity above a familiarity threshold is indicative of the real-time audio/video communication session having a greater appropriateness score than the real-time audio-only communication session.

In some implementations, the first communication mode is email, the second communication mode is one of text messaging and a real-time communication session, the contextual feature for the set of user communications is indicative of a level of familiarity between the first and second users of the first and second computing devices, the level of familiarity being above a first familiarity threshold is indicative of the real-time communication session having a greater appropriateness score than text messaging and email, and the level of familiarity being less than the first familiarity threshold and greater than a second familiarity threshold is indicative of text messaging having a greater appropriateness score than the real-time communication session and email.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
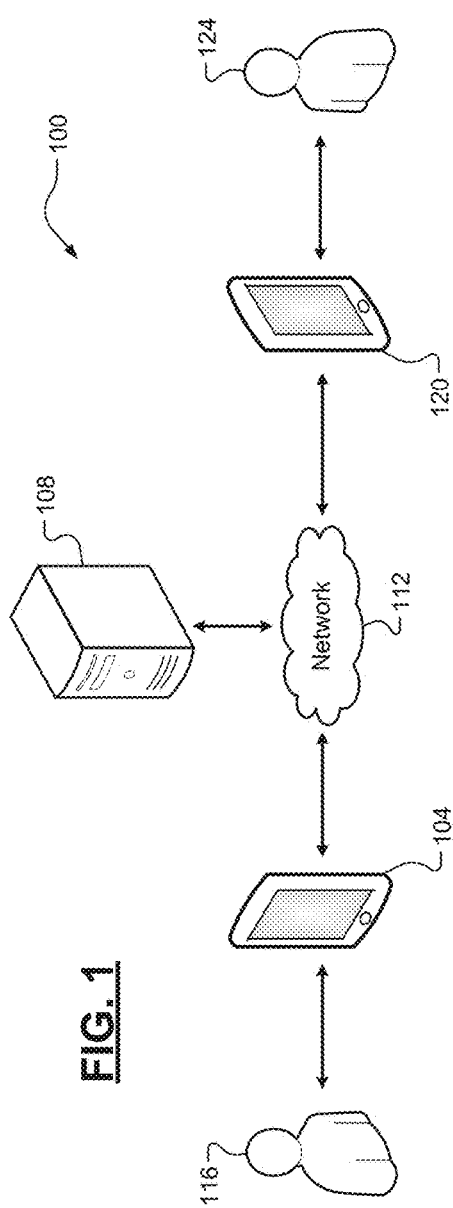
FIG. 1 is a diagram of an example computing system according to some implementations of the present disclosure.

As mentioned above, each communication mode by which users can communicate via their computing devices has advantages and disadvantages. Instant text messaging or chatting, for example, may have the lowest relative data and/or processing cost and may only require part of the user's attention, but it also may only be appropriate for exchanging short messages. A real-time audio/video communication session or "video chat," on the other hand, may be the most appropriate communication mode for a lengthy, detailed discussion, but it may also have the highest relative data and/or processing cost. Manually transitioning between these different communication modes, or manually setting up rules for automated communication mode switching, can be very time consuming. Accordingly, techniques are presented for contextually prompting users to switch communication modes.

These techniques provide for user prompting and automated or "one click" switching between communication modes based on a contextual analysis of a set of exchanged user communications. For example, this set of user communications can collectively represent a previous or current conversation between the users. While the text of electronic messages (text messages, emails, etc.) is primarily discussed herein, it will be appreciated that the user communications can include audio and/or video data that can be analyzed to determine contextual features (e.g., transcription of audio data to obtain text). Instead of transcription, a quantity of speech (e.g., a speech/non-speech classifier could be applied to measure the percentage of speech) or audio loudness could be used. At least some of these contextual features can be indicative of a level of detail of the set of user communications. A "detailed" conversation as discussed herein can be one that is lengthy (e.g., a large number of characters/words) and/or has a more complex topic (e.g., politics).

The contextual analysis can include, based on the contextual factors, determining an appropriateness score for each of a current communication mode and at least one other available communication mode. Some communication modes may also not always be available. Real-time audio/video communication sessions, for example, may be unavailable when the speed/strength of the network is below a threshold. Each appropriateness score can be indicative of a level of appropriateness for a particular communication mode for the set of communications. A more "appropriate" communication mode (e.g., an appropriateness score above a certain threshold) can refer to a particular communication mode likely increasing the efficiency of the conversation between the users. The appropriateness scores for these communication modes can then be compared to each other.

When the appropriateness score of another available communication mode is more than a threshold greater than the appropriateness score for the current communication mode, a suggestion to switch communication modes can be made. This can include, for example, outputting a pop-up window asking the user whether they would like to switch to the other communication mode. A response or switch command may then be received, which can cause the transition from the current to the other communication mode. This switching could also be performed automatically without prompting the user. The transitioning between communication modes can include transferring the previous user communications between software applications associated with the communication modes (e.g., from a text messaging application to an email application). This transition to the other communication mode is therefore seamless because no further user involvement is required (e.g., cutting/pasting text).

As mentioned, at least a portion of the techniques of the present disclosure could be at least partially implemented by an application (text messaging, email, voice call, video chat, etc.) executing at a client computing device. These applications could be, for example only, standalone applications. Non-limiting example user interfaces are discussed herein and illustrated in FIGS. 4A-4C and 5A-5C. Additionally or alternatively, these techniques could be at least partially implemented at an operating system level at the client computing device. Further, at least a portion of these techniques could be implemented at a server computing device (e.g., the contextual analysis of the set of user communications). The server computing device could, for example, provide a response to a request from the client computing device.

The present disclosure is directed to, inter alia, the technical problem of identifying a best or most appropriate communication mode based on user activity. More specifically, the present disclosure is directed to techniques for determining an appropriateness score for each of a current communication mode and at least one other available communication mode and, if another available communication mode is more appropriate than the current communication mode, providing a suggestion for the user to switch to this other available communication mode. Previous user communications may also be seamlessly transferred to the new communication mode (e.g., from email to text message). The techniques utilize various hardware components and other forms of previously input information (previous user communications, a relationship between the users, etc.) to analyze the context of the communication between the users as part of determining the appropriateness scores.

Referring now to FIG. 1, an example computing system 100 according to some implementations of the present disclosure is illustrated. The computing system 100 can include a client computing device ("first computing device") 104 that can communicate with a remote server computing device 108 via a network 112. The network 112 can be a local area network (LAN), a wide area network (WAN), e.g., the Internet, or a combination thereof. While the first computing device 104 is shown to be a mobile phone, it will be appreciated that the first computing device 104 can be any suitable mobile computing device (a tablet computer, a laptop computer, etc.). The server computing device 108 can be any suitable hardware server or plurality of hardware servers operating in a parallel or distributed architecture. A first user 116 can operate the first computing device 104 to exchange user communications via the network 112 with another client computing device ("second computing device") 120 associated with a second user 124.

Figure 2:
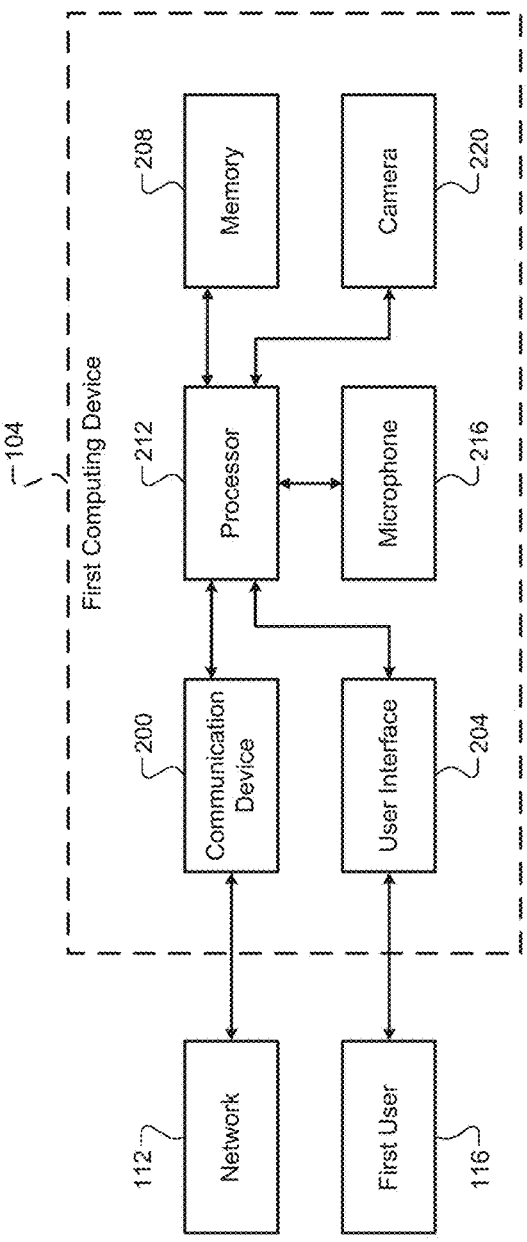
FIG. 2 is a functional block diagram of an example computing device according to some implementations of the present disclosure.

Referring now to FIG. 2, an example configuration for the first computing device 104 is illustrated. The server computing device 108 and the second computing device 120 can each have the same or similar configuration as the first computing device 104. The first computing device 104 can include a communication device 200 (e.g., a transceiver) configured for communication via the network 112. The first computing device 104 can include a user interface 204 (e.g., a touch display) configured to receive input and/or output information from/to the first user 116. The first computing device 104 can include a non-transitory computer-readable medium or computer memory 208 (flash, hard disk, etc.) configured to store information at the first computing device 104.

The first computing device 104 can also include a processor 212 configured to control operation of the computing device 104. The term "processor" as used herein can refer to both a single processor and a plurality of processors operating in a parallel or distributed architecture. In one implementation, the memory 208 may store a set of instructions that, when executed by the processor 212, causes the first computing device 104 to perform at least a portion of the techniques herein. The first computing device 104 can also include other devices, such as a microphone 216 and a camera 220 configured to capture audio data and video data, respectively.

Figure 3:
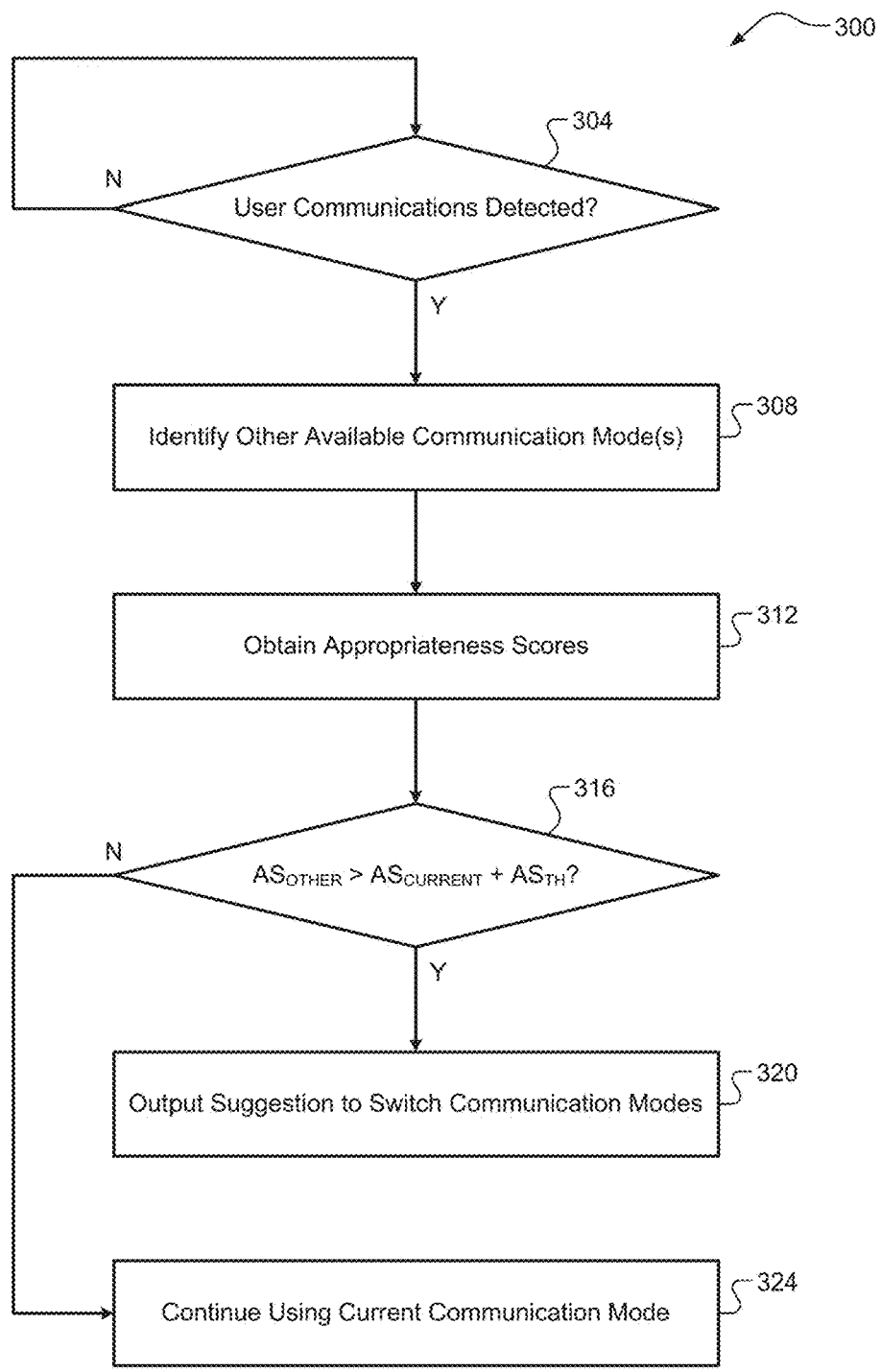
FIG. 3 is a flow diagram of an example method for contextually prompting users to switch communication modes according to some implementations of the present disclosure.

Referring now to FIG. 3, a flow diagram of an example method 300 for contextually prompting the first user 116 to switch communication modes is illustrated. At 304, the first computing device 104 can detect a set of user communications at least one of transmitted to and received from the second computing device 120 via a first communication mode. This set of user communications may collectively represent a previous or current conversation between the first user 116 and the second user 124. Non-limiting examples user communications include text messages, emails, and transcribed audio from audio-only or audio/video streams. At 308, the first computing device 104 can identify a second communication mode that is available for communication between the first and second computing devices 104, 120. Each communication mode can define a corresponding communication protocol for communication via the first and second computing devices 104, 120. Each protocol can define different rules for the computing devices 104, 120 to follow/execute during communication.

The availability of the second communication mode can be based on (i) whether the devices 104, 120 are capable of communication via the communication protocol defined by the second communication mode and (ii) whether this second communication mode or its protocol is enabled at both devices 104, 120. Other factors may also be used in determining the availability, such as signal strength via the second communication mode or other network conditions, data costs, the users' preferences, and the like. Non-limiting examples of the first/second communication modes include instant text messaging or chatting, email, real-time audio-only or voice call, and real-time audio/video or video chat. As previously mentioned, there may be other factors that affect whether a particular communication mode is available. For example, video chat could be manually disabled or a automatically disabled when a strength of the network 112 is below an acceptable level.

At 312, the first computing device 104 can obtain an appropriateness score for the first and second communication modes based on contextual features of the set of user communications. Each contextual feature can be indicative of a level of detail of a particular user communication, and each appropriateness score can be indicative of a level of appropriateness of a particular communication mode for the set of user communications and their corresponding levels of detail. Non-limiting examples of the contextual features include text length (number of characters/words), frequency or time between user communications, network strength, network data costs, a conversation topic and/or a number of mentions of particular persons/places/things during the conversation, user preferences, device type/capabilities, ambient noise (e.g., captured by the microphone 216), the user's current state, a history or relationship (real-life and/or social network-based) between the users, and a history of communication between the users, time zone differences, and a sentiment of the conversation (annoyed, happy, sad, etc.). Each of these contextual features can be utilized to generate the appropriateness score for a particular communication mode.

Loud or excessive ambient noise, for example, may be indicative of text messaging or email being more appropriate than a real-time audio-only or audio/video communication session because the ambient noise may negatively affect the captured and/or output audio during the session. Low network strength and/or high network costs may similarly favor text messaging or email over real-time audio-only and audio/video communication sessions. The user's current state as used herein refers to what the user's current activity. For example, it may be determined that the user is riding a bike based on other information, such as repeated use of voice-to-text input or the execution of a fitness software application. This user state may be indicative of a real-time audio-only or audio/video communication session being more appropriate than text messaging or email because it may be difficult for the user to type. The user's current activity could be determined, for example, based on measurements from an accelerometer of the first computing device 104. For example, a higher gravitational force ("g-force") measurement by the accelerometer may be indicative of a current activity where it would be difficult for the user to type (e.g., jogging/running or riding on a bike or in a vehicle). A sad or annoyed sentiment to the conversation or a large time zone difference may be indicative of real-time communication sessions being less appropriate than text messaging and email, whereas a happy or excited sentiment could be indicative of the opposite. A large number of mentions of particular persons/places/things could be indicative of a more detailed conversation where a real-time communication session could be more appropriate than text messaging and email. The remainder of the example contextual factors listed above will now be discussed in greater detail.

Figure 4A:
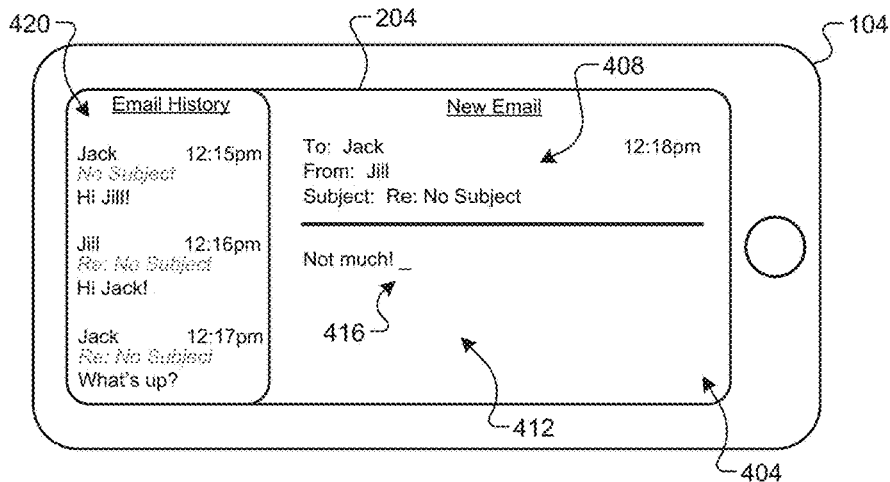
FIGS. 4A-4C are example user interfaces for a suggested switch from email to text messaging according to some implementations of the present disclosure.
Figure 4B:
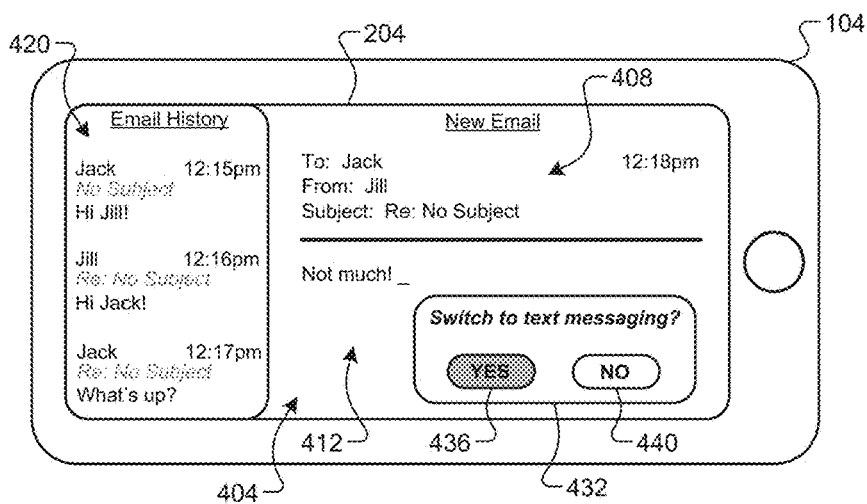
Figure 4C:
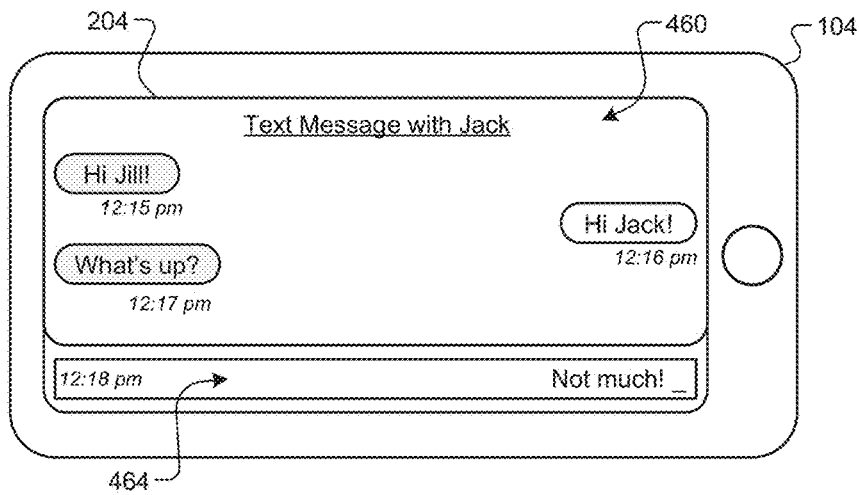

Referring now to FIGS. 4A-4C and with continued reference to FIG. 3, example user interfaces are illustrated. In FIG. 4A, the user interface 204 (e.g., a touch display) of the first computing device 104 is displaying emails. Specifically, a new email is being composed in an email composition area 404. This new email includes a header 408 and a body 412, with a cursor 416 indicating a current position in the body 412 where the first user 116 is typing. Previous emails are also shown in an email history area 420. As can be seen, the second user 124 (Jack) sent an email to the first user 116 (Jill) of first computing device 104 at 12:15 pm that had no subject and the text "Hi Jill!" At 12:16 pm, Jill responded to this email with an email having the text "Hi Jack!" At 12:17 pm, Jack responded to Jill's email with another email having the text "What's up?" At 12:18 pm, Jill is currently composing a response to Jack's email of 12:17 pm with the text "Not much!" A variety of factors may indicate that text messaging is the more appropriate communication mode for these user communications.

Specifically, the length of text in each user communication is relatively short—only two words per email. The emails also have a high frequency in that each was sent only a minute apart. An analysis of the text can indicate that there is no clear topic for the conversation. Instead, this could be classified as small talk between users, which is a low level of detail. Another factor that may indicate that this is merely small talk is the emails have no subject. At 312, the first computing device 104 can obtain an appropriateness score for the current communication mode (email) and at least one other available communication mode, such as text messaging. It will be appreciated that these appropriateness scores can be generated either locally at the first computing device 104, remotely at the server computing device 108, or some combination thereof.

At 316, the first computing device 104 can determine whether any other available communication modes have an appropriateness score ($AS_{OTHER}$) greater than a sum of the appropriateness score for the current communication mode ($AS_{CURRENT}$) and a threshold ($AS_{TH}$). When there is one, a suggestion can be provided to switch to this other communication mode at 320. Otherwise, the current communication mode can continued to be utilized at 324. The appropriateness scores may also be calculated at regular time intervals, as opposed to a single time as illustrated. For example, the appropriateness scores could be calculated every few seconds. The appropriateness scores could also be computed at certain events, such as a text message being sent or received. The appropriateness scores may also be aggregated over a period or a number of samples (scores). For example, a simple aggregation scheme could take the average or median appropriateness score within some window of N scores (where N is an integer greater than one).

The threshold may be zero, and thus a switch to even a slightly more appropriate communication mode could be suggested. This threshold, however, can also be utilized to prevent repeated suggestions to switch back/forth between communication modes that have approximately the same appropriateness score. It will be appreciated that different thresholds could be used for each transition (text to email, email to audio/video, etc.). These different thresholds, for example, could be user-specified or could be learned over time based on the user's activity and/or other users' activity. It will also be appreciated that the threshold does not need to be based on the appropriateness score for the first communication mode. For example, the threshold could only be based on the appropriateness score for the second communication mode. In other words, if the appropriateness score for the second communication mode satisfies a threshold, the suggestion could be provided or the automatic switch could be performed, regardless of the appropriateness score of the first communication mode. The threshold could also change. For example, the threshold could be increased if the user cancels or says no in response to the prompt to switch communication modes. This could help prevent repeated suggestions to switch. Alternatively, switch suggestions could no longer be provided during the current communication session.

In FIG. 4B, the appropriateness score for text messaging is greater than the sum of the appropriateness score for email and the threshold. Thus, a suggestion is provided in the form of a pop-up menu or window 432 that includes the prompt "Switch to text messaging?" and two selectable options 436 ("Yes") and 440 ("No"). Other suitable prompts could be provided, such as via an existing menu that is integrated into the current software application. As shown, the first user 116 (Jill) has selected option 436 ("Yes"). While the first user 116 may be prompted and the communication mode switch may only be performed in response to their confirmation, it will be appreciated that automatic switching between communication modes could be performed. For example, this could be an option that could be manually turned on/off at the first computing device 104.

In FIG. 4C, the transition from email to text messaging has been completed. In this text messaging mode, there is a text message area 460 and a text input area 464. As shown, the text from the previous emails, as well as the email that was in the process of being composed, have also been transferred to this text messaging mode. The format of the previous emails has changed (e.g., there is no more email header/subject) but, as can be seen in the text message area 460, the majority of the contents remain: the text of the emails, the time stamps, and some indication of which messages correspond to which user (e.g., Jack's messages are on the left, and Jill's are on the right). The text of the email that was currently being composed by Jill was also transferred to the text input area 464. This seamless transition allows the first user 116 (Jill) to continue composing her message to the second user 124 (Jack), which can then be sent as a text message instead of an email.

The first computing device 104 can determine or obtain user information to assist in this transition between communication modes. For example, when switching from text messaging to email, the first computing device 104 may initially be utilizing a telephone number (e.g., SMS text messaging) or another unique text messaging identifier associated with the second user 124. In order to switch to email, however, the first computing device 104 must obtain the email address of the second user 124. The first computing device 104, therefore, can leverage user profiles and other sources of user information (e.g., social networks). For example, a user profile associated with the second user 124 may be stored at the first computing device 104 or at another server and may include one or more telephone numbers, an email address, and other contact information. The first computing device 104 can access the information in such user profiles in order to seamlessly perform the switch (e.g., without the first user 116 needing to provide the email address for the second user 124).

Figure 5A:
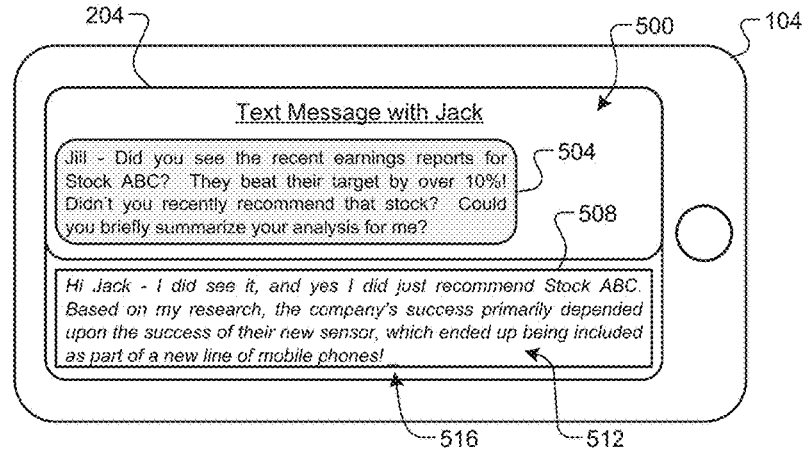
FIGS. 5A-5C are example user interfaces for a suggested switch from text messaging to a voice call or a video chat according to some implementations of the present disclosure.
Figure 5B:
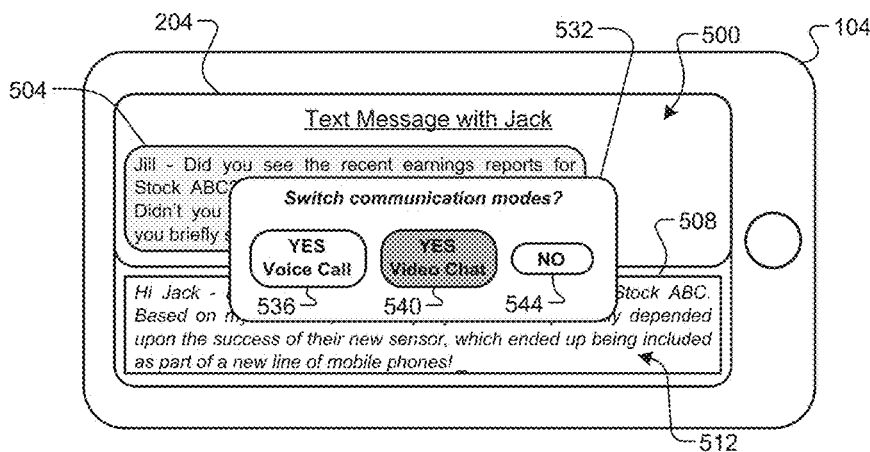
Figure 5C:
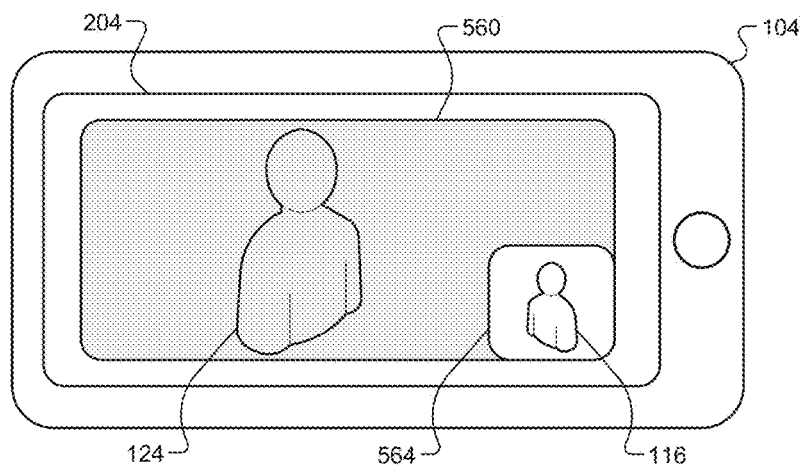

FIGS. 5A-5C illustrate other example user interfaces and a different suggested switch between communication modes. In FIG. 5A, the user interface 204 (e.g., a touch display) of the first computing device 104 is displaying text messages. Specifically, a text message area 500 displays a previously received text message 504 and a new text message 512 that is currently being composed (see, e.g., cursor 516) in a text input area 508. In addition to including a very length text, the previously received text message 504 from the second user 124 (Jack) is very detailed. It asks three separate questions—"Did you see the recent earnings report for Stock ABC?", "Didn't you recently recommend that stock?", and "Could you briefly summarize your analysis for me?" Multiple questions can be indicative of a communication mode in which the first user 116 (Jill) may wish to provide a more detailed response. As shown, the first user 116 (Jill) is in the process of composing a very lengthy, detailed text message 512 in response to Jack's text message 504.

The first computing device 104 may also discern the topic of this conversation, which is investments/finance. Such a topic may be considered to be more detailed than other topics, such as small talk between users. All of these factors are indicative of this being a very detailed conversation, for which text messaging may have an appropriateness score that is less than the appropriateness score for other communication modes (e.g., real-time audio-only or audio/video). Email may have a similarly low appropriateness score. Real-time audio-only or audio/video, such as a voice call or a video chat, however, may have an appropriateness score that is greater than a sum of the appropriateness score for text messaging and the threshold. This may be because a real-time communication session should be more efficient for such a detailed conversation about a complex topic. As such, a suggestion is made via a pop-up menu 532 in FIG. 5B. This pop-up menu includes the text "Switch communication modes?" and three different selectable options 536 ("YES Voice Call"), 540 ("YES Video Chat"), and 544 ("NO"). As shown, the first user 116 (Jill) has selected option 540 ("YES Video Chat") to switch from text messaging to video chat.

The history or relationship between the first and second users 116, 124 can also be a contextual factor for the appropriateness scores for a particular communication mode. This can be determined based on past communications between the users and/or via other sources of information, such as their connection on social networks. Another factor could be whether the users 116, 124 have ever participated in a video chat with each other before. For example, users that do not know each other on an intimate level, such as recently-introduced businesspeople, would likely prefer a voice call over a video chat. Users that are best friends or close work colleagues, such as Jill and Jack here, on the other hand, may prefer a video chat instead of a voice call. Thus, video chat could be suggested along with voice call as shown, or only video chat could be suggested (e.g., when its appropriateness score is much higher than the appropriateness score for a voice call).

In FIG. 4C, the first computing device 104 seamlessly transitions from text messaging to a video chat session. In a primary video chat window 560, a video feed of the second user 124 (Jack) is shown. A video feed of the first user 116 (e.g., captured by the camera 220) may also be shown in a secondary video chat window 564. While not shown, it will be appreciated that other information may also be readily available or easily accessible during the video chat session. For example, a small window could be provided (e.g., in the upper right corner of the video chat window 560 or in another window separate from the video chat window) that displays Jack's previous message and/or Jill's message that she was composing, or some summary of these messages. This could then be referenced by the users 116, 124 to continue their conversation via the video chat session.

One or more systems and methods discussed herein do not require collection or usage of user personal information. In situations in which certain implementations discussed herein may collect or use personal information about users (e.g., user data, information about a user's social network, user's location and time, user's biometric information, user's activities and demographic information), users are provided with one or more opportunities to control whether the personal information is collected, whether the personal information is stored, whether the personal information is used, and how the information is collected about the user, stored and used. That is, the systems and methods discussed herein collect, store and/or use user personal information only upon receiving explicit authorization from the relevant users to do so. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
  detecting, by a first computing device having one or more processors, a set of user communications comprising two or more user communications, each of the two or more user communications being transmitted to or received from a second computing device via a first communication mode that defines a first communication protocol for communication between the first and second computing devices;
  identifying, by the first computing device, a second communication mode that is available for communication between the first and second computing devices, the second communication mode defining a different second communication protocol for communication between the first and second computing devices;
  obtaining, by the first computing device, an appropriateness score for the first and second communication modes based on a set of contextual features of the set of user communications, wherein each contextual feature relates to an appropriateness of a particular communication mode for the set of user communications, wherein each appropriateness score is indicative of a level of the appropriateness of a particular communication mode for the set of user communications, and wherein the set of contextual features includes an amount of time between the two or more user communications; and when the appropriateness score for the second communication mode satisfies a threshold, outputting, by the first computing device, a suggestion to switch from the first communication mode to the second communication mode, wherein a larger amount of time between the two or more user communications corresponds to higher appropriateness scores for text-based communication modes and lower appropriateness scores for audio-only and audio/video based communication modes, and wherein a smaller amount of time between the two or more user communications corresponds to higher appropriateness scores for audio-only and audio/video based communication modes and lesser appropriateness scores for text-based communication modes.

2. The computer-implemented method of claim 1, wherein the set of contextual features include a level of detail of a particular user communication and each appropriateness score is indicative of the level of appropriateness of a particular communication mode for the set of user communications and corresponding levels of detail of the particular user communication.

3. The computer-implemented method of claim 1, further comprising receiving, by the first computing device, a command that causes the first computing device to switch from the first communication mode to the second communication mode.

4. The computer-implemented method of claim 3, wherein outputting the suggestion includes displaying, by the first computing device, a pop-up menu including one or more selectable options for causing the first computing device to switch or not to switch from the first communication mode to the second communication mode.

5. The computer-implemented method of claim 3, further comprising in response to switching from the first communication mode to the second communication mode:
 transferring, by the first computing device, the set of user communications from a first software application associated with the first communication mode to a second software application associated with the second communication mode; and
 displaying, by the first computing device, the set of user communications in the second software application.

6. The computer-implemented method of claim 1, wherein: each of the two or more user communications includes text; the first communication mode is one of text messaging and email; the second communication mode is the other of text messaging and email; and the set of contextual features includes a length of the text of each user communication.

7. The computer-implemented method of claim 6, wherein shorter text is indicative of text messaging having a greater appropriateness score than email, and wherein longer text is indicative of text messaging having a lower appropriateness score than email.

8. The computer-implemented method of claim 1, wherein: each of the two or more user communications includes text; the first communication mode is one of text messaging and email; the second communication mode is one of a real-time audio-only communication session and a real-time audio/video communication session; and the set of contextual features includes a length of the text of each user communication.

9. The computer-implemented method of claim 8, wherein shorter text is indicative of text messaging and email having a higher appropriateness score than real-time audio-only and audio/video communication sessions, and wherein longer text is indicative of text messaging and email having a lower appropriateness score than real-time audio-only and audio/video communication sessions.

10. The computer-implemented method of claim 9, wherein the set of contextual features includes a level of familiarity between first and second users of the first and second computing devices, and wherein the level of familiarity above a familiarity threshold is indicative of the real-time audio/video communication session having a greater appropriateness score than the real-time audio-only communication session.

11. The computer-implemented method of claim 1, wherein:
 the first communication mode is email;
 the second communication mode is one of text messaging and a real-time communication session;
 the set of contextual features includes a level of familiarity between the first and second users of the first and second computing devices;
 the level of familiarity being above a first familiarity threshold is indicative of the real-time communication session having a greater appropriateness score than text messaging and email; and
 the level of familiarity being less than the first familiarity threshold and greater than a second familiarity threshold is indicative of text messaging having a greater appropriateness score than the real-time communication session and email.

12. The computer-implemented method of claim 1, wherein the first and second communication modes are each selected from the group consisting of:
 (i) text messaging;
 (ii) email;
 (iii) a real-time, audio-only communication session; and
 (iv) a real-time, audio/video communication session.

13. A first computing device comprising:
 a non-transitory computer-readable medium having a set of instructions stored thereon; and
 one or more processors configured to execute the set of instructions, which causes the one or more processors to perform operations comprising:
  detecting a set of user communications comprising two or more user communications, each user communication being transmitted to or received from a second computing device via a first communication mode that defines a first communication protocol for communication between the first and second computing devices;
  identifying a second communication mode that is available for communication between the first and second computing devices, the second communication mode defining a different second communication protocol for communication between the first and second computing devices;
  obtaining an appropriateness score for the first and second communication modes based on a set of contextual features of the set of user communications, wherein each contextual feature relates to an appropriateness of a particular communication mode for the set of user communications, wherein each appropriateness score is indicative of a level of the appropriateness of a particular communication mode for the set of user communications, and wherein the set of contextual features includes an amount of time between the two or more user communications; and when the appropriateness score for the second communication mode satisfies a threshold, outputting, by the first computing device, a suggestion to switch from the first communication mode to the second communication mode, wherein a larger amount of time between the two or more user communications corresponds to higher appropriateness scores for text-based communication modes and lower appropriateness scores for audio-only and audio/video based communication modes, and wherein a smaller amount of time between the two or more user communications corresponds to higher appropriateness scores for audio-only and audio/video based communication modes and lesser appropriateness scores for text-based communication modes.

14. The first computing device of claim 13, wherein the set of contextual features includes a level of detail of a particular user communication and each appropriateness score is indicative of the level of appropriateness of a particular communication mode for the set of user communications and corresponding levels of detail of the particular user communication.

15. The first computing device of claim 13, wherein the operations further comprise receiving a command that causes the first computing device to switch from the first communication mode to the second communication mode.

16. The first computing device of claim 15, wherein outputting the suggestion includes displaying a pop-up menu including one or more selectable options for causing the first computing device to switch or not to switch from the first communication mode to the second communication mode.

17. The first computing device of claim 15, wherein the operations further comprise in response to switching from the first communication mode to the second communication mode:
transferring the set of user communications from a first software application associated with the first communication mode to a second software application associated with the second communication mode; and
displaying the set of user communications in the second software application.

18. The first computing device of claim 13, wherein: each of the two or more user communications includes text; the first communication mode is one of text messaging and email; the second communication mode is the other of text messaging and email; and the set of contextual features includes a length of the text of each user communication.

19. The first computing device of claim 18, wherein shorter text is indicative of text messaging having a greater appropriateness score than email, and wherein longer text is indicative of text messaging having a lower appropriateness score than email.

20. The first computing device of claim 13, wherein: each of the two or more user communication includes text; the first communication mode is one of text messaging and email; the second communication mode is one of a real-time audio-only communication session and a real-time audio/video communication session; and the set of contextual features includes a length of the text of each user communication.

21. The first computing device of claim 20, wherein shorter text is indicative of text messaging and email having a higher appropriateness score than real-time audio-only and audio/video communication sessions, and wherein longer text is indicative of text messaging and email having a lower appropriateness score than real-time audio-only and audio/video communication sessions.

22. The first computing device of claim 21, wherein the set of contextual features includes a level of familiarity between first and second users of the first and second computing devices, and wherein the level of familiarity above a familiarity threshold is indicative of the real-time audio/video communication session having a greater appropriateness score than the real-time audio-only communication session.

23. The first computing device of claim 13, wherein:
the first communication mode is email;
the second communication mode is one of text messaging and a real-time communication session;
the set of contextual features includes a level of familiarity between the first and second users of the first and second computing devices;
the level of familiarity being above a first familiarity threshold is indicative of the real-time communication session having a greater appropriateness score than text messaging and email; and
the level of familiarity being less than the first familiarity threshold and greater than a second familiarity threshold is indicative of text messaging having a greater appropriateness score than the real-time communication session and email.

24. The first computing device of claim 13, wherein the first and second communication modes are each selected from the group consisting of:
(i) text messaging;
(ii) email;
(iii) a real-time, audio-only communication session; and
(iv) a real-time, audio/video communication session.

* * * * *